United States Patent [19]

Asada et al.

[11] 4,425,818

[45] Jan. 17, 1984

[54] ROBOTIC MANIPULATOR

[75] Inventors: Haruhiko Asada; Takeo Kanade, both of Pittsburgh, Pa.

[73] Assignee: Carnegie-Mellon University, Pittsburgh, Pa.

[21] Appl. No.: 307,090

[22] Filed: Sep. 30, 1981

[51] Int. Cl.³ .............................................. B23Q 3/18
[52] U.S. Cl. .................................... 74/469; 310/112; 318/568; 414/4
[58] Field of Search ............... 74/469; 3/1.1; 310/112; 318/568; 414/4

[56] References Cited

U.S. PATENT DOCUMENTS

| 3,759,563 | 9/1973 | Kitamura | 414/4 X |
| 3,898,838 | 8/1975 | Connelly | 318/568 X |
| 4,221,997 | 9/1980 | Flemming | 318/568 X |
| 4,283,764 | 8/1981 | Crum et al. | 318/568 X |
| 4,375,047 | 2/1983 | Nelson et al. | 310/112 X |

FOREIGN PATENT DOCUMENTS

| 2754609 | 6/1979 | Fed. Rep. of Germany | 414/4 |
| 889319 | 2/1962 | United Kingdom | 414/4 |

Primary Examiner—Allan D. Herrmann
Attorney, Agent, or Firm—Buell, Blenko, Ziesenheim & Beck

[57] ABSTRACT

A robotic manipulator includes a plurality of segments connected by joints between a fixed base and the distal end of the arm. At least one of the joints comprises a servomotor having a stator and a rotor one of which is attached to a segment positioned closer to the fixed base, the other component of the servomotor being attached to a driven segment positioned closer to the distal end of the arm. The said mechanical arm is directly driven by the servo motor without provision of any transmission mechanism.

4 Claims, 6 Drawing Figures

ROBOTIC MANIPULATOR

BACKGROUND OF THE INVENTION

The present invention relates to an articulated robotic manipulator having a plurality of segments between a fixed base and its distal end. It is more particularly concerned with an electrically operated direct drive manipulator.

Electrically powered manipulators presently in use for robots are considered inferior to human arms and are unsatisfactory for many applications, both with respect to speed of operation, accuracy and versatility. A principal reason for their poor performance is found in the transmission mechanisms such as gear trains, lead screws, belts, chains and linkages which are used to transmit power from the drive motors to the load and to increase the drive torque. These transmission mechanisms are subject to friction and backlash and require careful adjustment and regular maintenance.

With one type of robotic manipulator heretofore known, each of the joints between segments includes a member positioned closer to the fixed base, which member may be called a driving member, provided with an electric motor with a gear mounted on the output shaft of the motor, and a driven member positioned closer to the distal end of the arm and provided with a gear of larger diameter than the gear. The driven member is operated by the motor through the gears for speed reduction. Since each of the joints between the segments is thus provided with a motor and reduction gear mechanism, the manipulator is undesirably bulky and heavy.

Other manipulators are also known in which each joint between segments includes a hydraulic cylinder connecting a segment or member positioned closer to the fixed base to a driven member. Such manipulators, however, are also bulky and heavy, while oil leaks and other troubles are likely to result in reduced control accuracy.

SUMMARY OF THE INVENTION

In view of the above problems, a first object of the present invention is to provide a robotic manipulator for use in industries which is compact, lightweight and controllable with high accuracy.

To fulfill this object, the present invention provides a robotic manipulator which includes a plurality of joints between a fixed base and the distal end of an arm and which is characterized in that at least one of the joints comprises a servomotor having a stator and a rotor, one of the components of the servomotor being attached to a driving member positioned closer to the fixed base, the other component being attached to a driven member positioned closer to the distal end of the arm.

Because of the characteristic feature described above, the robotic manipulator of this invention is free of the problems, such as power loss, backlash and stretch of chain in the transmission mechanism, which are encountered with conventional manipulators wherein gears and the like are used as reduction means. In fact, the present manipulator is movable more delicately and elaborately than heretofore possible, while it is well adapted for feedback control because the movement of the arm can be transmitted to the control system accurately.

A second object of the invention is to provide a robotic manipulator with use of a small-sized motor.

To fulfill the second object, the invention provides a robotic manipulator of the type described above wherein in one of the joints, a tubular first driven member extends in a direction intersecting the axis about which it moves at an angle, which may be a right angle, to that axis, such movement being hereinafter called "rotational", and a second driven member is fitted in the first driven member, which serves as a member positioned close to the fixed base for the second driven member for movement about the common axis of the two members, such movement being hereinafter called "pivotal". The servomotor for pivotally driving the second driven member is positioned on one side of the rotational axis of the first driven member, and the end of the second driven member toward the distal end of the arm is positioned on the other side of the rotational axis. Accordingly, the assemblies on the opposite sides of the rotational axis can be easily maintained in balance under gravity. This reduces the static torque for the arm, i.e. the torque needed for holding the arm in balance when the arm is not loaded, consequently permitting the use of a motor of reduced capacity and therefore of smaller size.

A third object of the invention is to provide a robotic manipulator in which the arm is movable with increased stability and which is made compact in its entirety.

To fulfill the third object, the invention provides a robotic manipulator of the type described wherein in one of the joints a driven member is rotatably supported on opposite sides thereof by a member positioned closer to the fixed base, and a pair of servomotors which are driven in synchronism with each other are provided on the opposite support portions respectively. Accordingly, the arm is movable with enhanced stability by being rendered free from an eccentric motor load, while the two motors, which are disposed as opposed to each other, afford improved weight-torque characteristics. (For example, if the weight of motor is constant, a motor of greater torque is usable, whereas if the torque is constant, a smaller motor of reduced weight is usable.) Furthermore, it is possible to provide a motor between the opposed motors out of alignment therewith. Thus, the robotic manipulator can be compact in its entirety.

Other objects and advantages of the present invention will become apparent from the following description.

Our invention comprises a direct drive manipulator arm in which the drive mechanisms for the joints in the arm are housed within those joints. We utilize permanent magnet direct current motors for driving purposes, and desirably employ motors with cobalt—rare earth magnets for at least some of the joints in the arm.

A presently preferred embodiment of our invention is illustrated in the attached figures to which reference is now made.

DESCRIPTION OF THE PREFERRED EMBODIMENT

Figure 1:
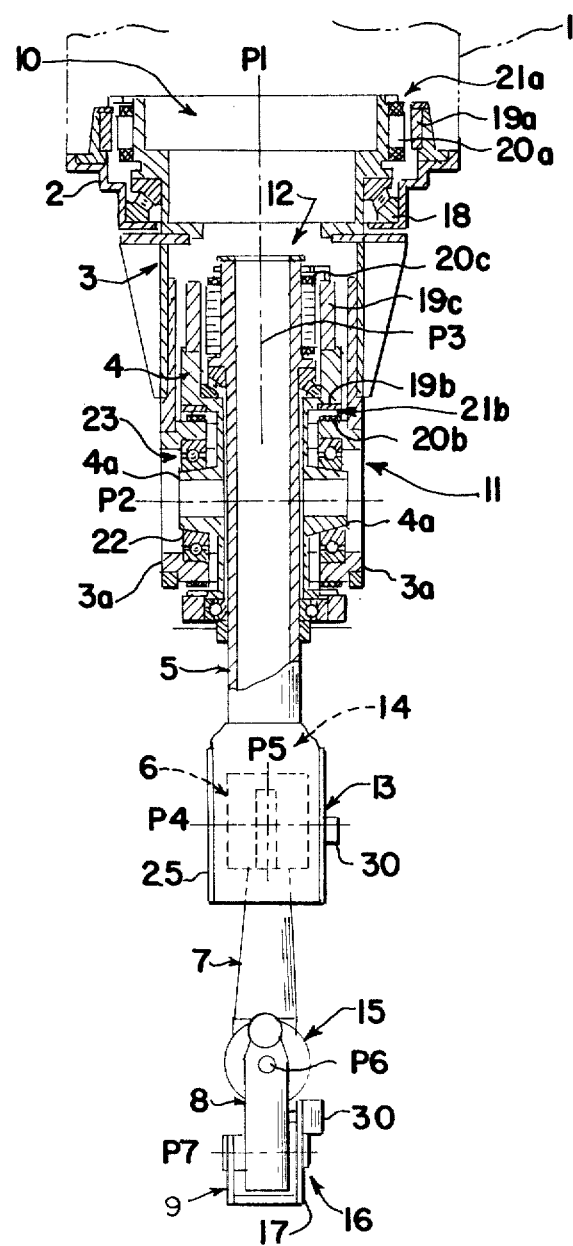
FIG. 1 is an overall front elevation partly broken away.
Figure 2:
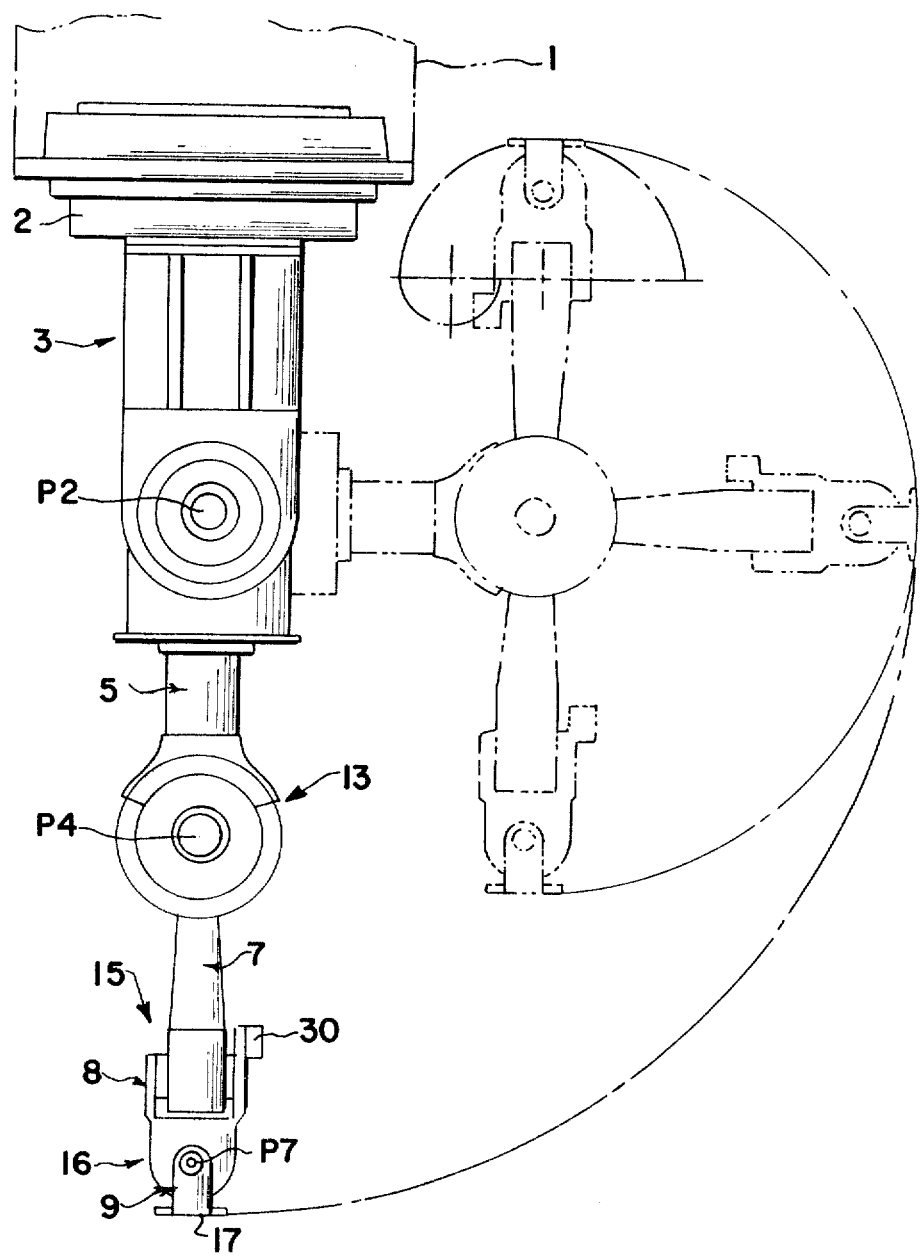
FIG. 2 is an overall side elevation.

A fixed base 1 has connected thereto a tubular case 2, to which first to seventh arms or segments 3, 4, 5, 6, 7, 8 and 9 are moveably coupled one after another by first to seventh joints 10, 11, 12, 13, 14, 15 and 16, respectively. A mount 17 for various working implements is attached to the forward end of the seventh arm 9. The arms 3, through 9 inclusive, are driven by a control system, such as a microcomputer, under a predetermined program to move the working implement attached to the mount 17 in three dimensions. The robotic manipulator thus constructed is used in industries for welding and assembling parts and also for coating, etc. involving unfavorable work environments.

Figure 3:
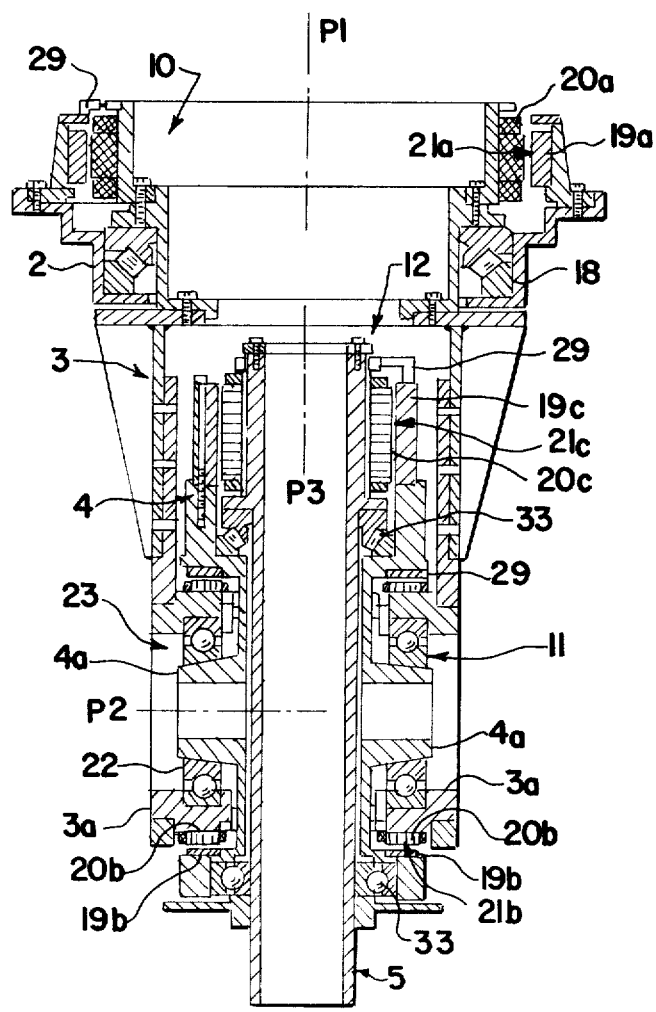
FIG. 3 is an enlarged sectional view of a portion of FIG. 1 showing first to third joints.

As shown in FIG. 3, the first arm 3 is mounted on the tubular case 2 with a roller bearing 18 provided therebetween to pivot about a first axis $P_1$ coaxial with tubular case 2. A permanent magnetic torque servomotor 21a comprises a stator 19a attached to the tubular case 2 and a rotor 20a attached to the first arm 3.

The first arm 3 is bifurcated into forks 3a, 3a at its distal end. Stub shafts 4a, 4a projecting from the second arm 4 are supported by bearings 22 on the opposed portions 3a, 3a. Thus the second arm 4 is movable rotationally about a second axis $P_2$ intersecting the first axis $P_1$ at right angles thereto. At the opposite bearing portions 23, 23, stators 19b, 19b are attached to the stub shafts 4a, 4a, respectively, while rotors 20b, 20b are attached to the forks 3a, 3a, respectively. These members 19b, 20b comprise permanent magnetic torque servomotors 21b, 21b, which are driven in synchronism with each other. The angle between the intersecting axes $P_1$ and $P_2$ need not always be a right angle.

The second arm 4 is tubular and has fitted therein the third arm 5 which is in the form of a sleeve. The third arm 5 is pivoted within the second arm 4 on bearings 33, 33 about a third axis $P_3$ which is substantially in alignment with the axis of sleeve 5. Above the axis $P_2$ as shown in the figures, a stator 19c is attached to the second arm 4 coaxial therewith and a rotor 20c to the third arm 5 to constitute a permanent magnetic torque servomotor 21c. Thus, the motor 21c is displaced from the second axis $P_2$, and the fourth to seventh arms 6, 7, 8 and 9 are oppositely displaced therefrom along arm 5, whereby the whole arm assembly is made easy to balance under gravity.

Figure 4:
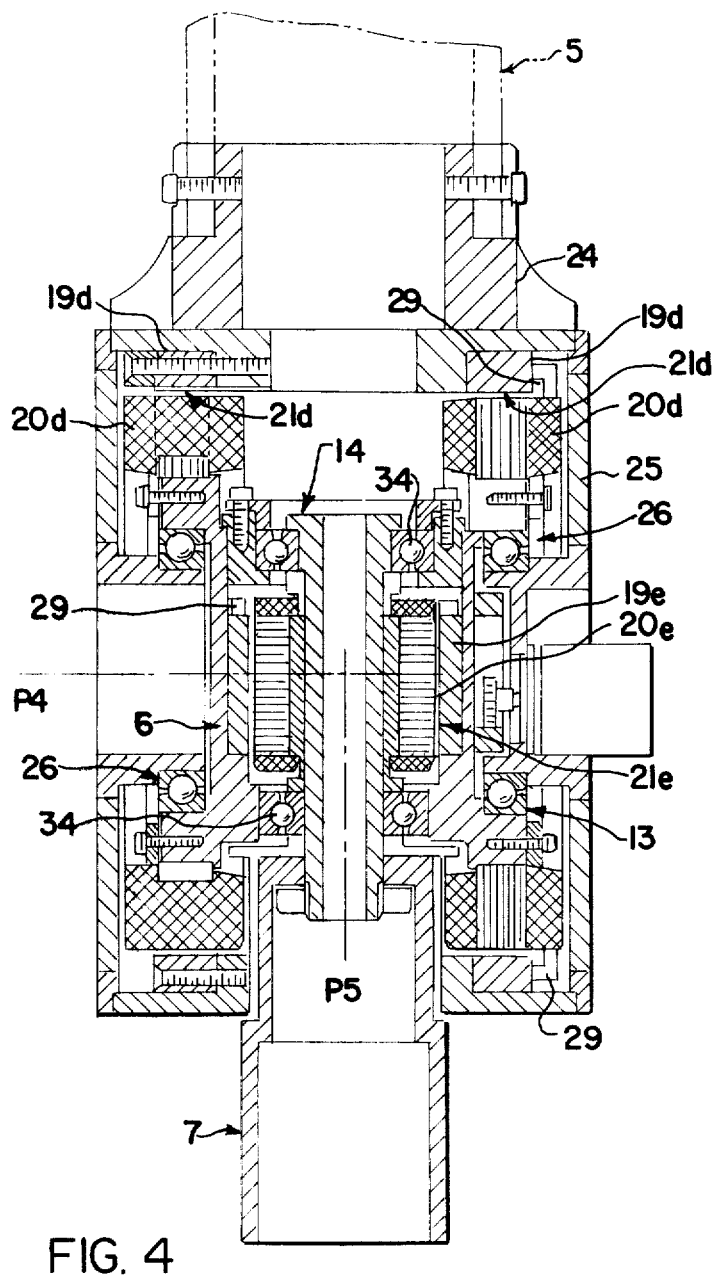
FIG. 4 is an enlarged sectional view of another portion of FIG. 1 showing fourth and fifth joints.

With reference to FIG. 4, frames 25, 25 opposed to each other are connected by a support member 24 to the distal end of the third arm 5. The fourth arm 6 is positioned between the frames 25, 25 and supported by bearing portions 26, 26 thereof. The fourth arm 6 is rotatable about a fourth axis $P_4$ intersecting the third axis $P_3$ at right angles thereto. Stators 19d, 19d are attached to the frames 25, 25, respectively and rotors 20d, 20d to the fourth arm 6, forming a pair of permanent magnetic torque servomotors 21d, 21d, which are driven in synchronism with each other.

The fourth arm 6 is tubular and has fitted therein the fifth arm 7 which is in the form of a sleeve. The fifth arm 7 pivots relative to the fourth arm 6 on bearings 34, 34 about a fifth axis $P_5$ substantially in alignment with the axis of the sleeve and intersecting the fourth axis $P_4$ at right angles thereto. A stator 19e is attached to an inner peripheral portion of the fourth arm 6 and a rotor 20e to an outer peripheral portion of the fifth arm 7 to constitute a permanent magnetic torque servomotor 21e.

Figure 5:
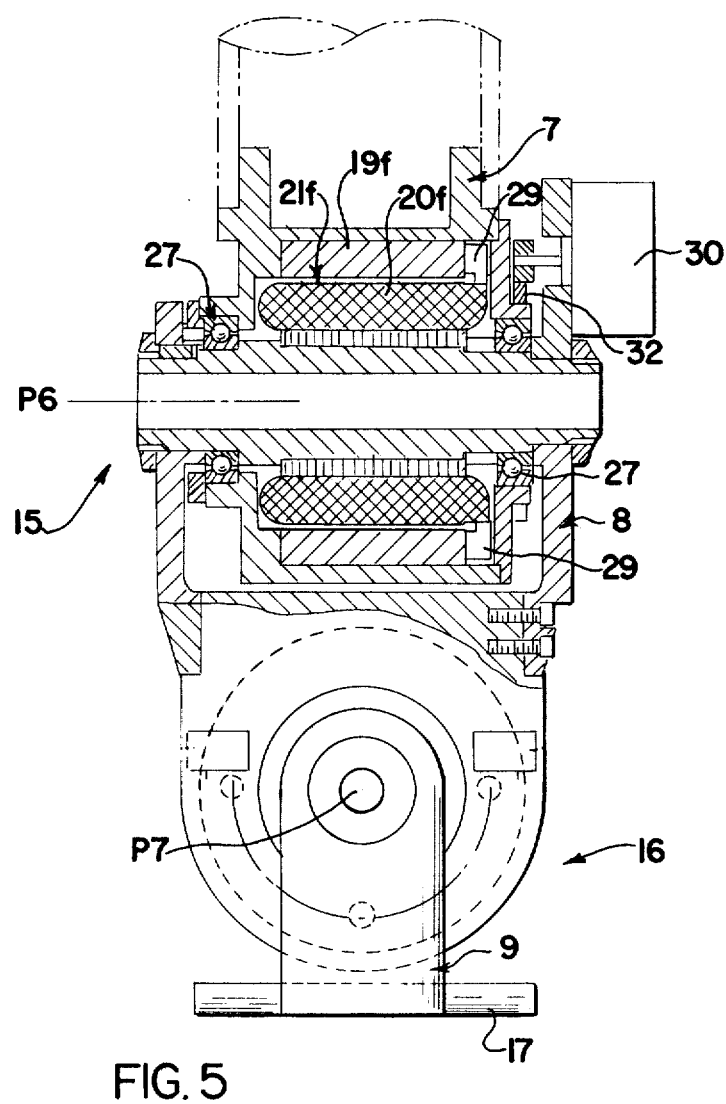
FIG. 5 is an enlarged sectional view of a portion of FIG. 2 showing a sixth joint.

With reference to FIG. 5, the sixth arm 8 is coupled to the distal end of the fifth arm 7 and is rotatable about a sixth axis $P_6$ intersecting the fifth axis $P_5$ at right angles thereto. Between a pair of bearing portions 27, 27, a stator 19f is attached to the fifth arm 7 and a rotor 20f to the sixth arm 8 to constitute a permanent magnetic torque servomotor 21f.

Figure 6:
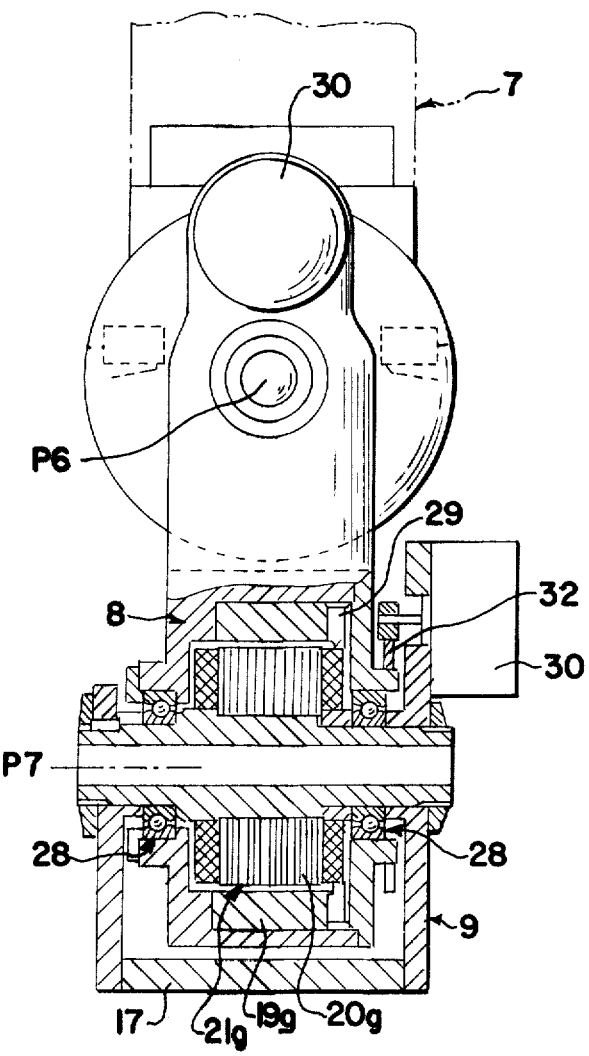
FIG. 6 is an enlarged sectional view of a third portion of FIG. 1 showing a seventh joint.

As shown in FIG. 6, the seventh arm 9 is coupled to the distal end of the sixth arm 8 and is rotatable about a sixth axis $P_7$ which is positioned at right angles to the sixth axis $P_6$ as twisted from the latter axis. Between a pair of bearing portions 28, 28, a stator 19g is attached to the sixth arm 8 and a rotor 20g to the seventh arm 9 to provide a permanent magnetic torque servomotor 21g.

Indicated at 29 in the various figures are brush ring mechanisms which maintain current-carrying contact between corresponding stators and rotor elements.

Indicated at 30 in the various figures are encoders for detecting the angular displacement of one arm relative to the other arm at each pivotal or rotational joint. The encoder 30 is coupled to the arm concerned through a pinion and an internally toothed gear 31 only for the fourth pivotal joint 13, or through an externally toothed gear 32 for the other joints. Through the gear ratio, the encoder is adapted to detect the relative angular displacement with improved accuracy. The motors 21a through 21g are driven for the desired manipulation while feeding the results detected by the encoders 30 to the control system.

Each of the several joints is provided with a pair of limit switches for limiting the range of pivotal movement of the arm concerned.

The present invention is not limited to the above embodiment having seven arms, but can also be embodied as manipulators having at least two joints and two or more arms.

Although only the motor 21c for the third joint 12 is made to serve also as a balancer with respect to the second joint 11, other motors may be adpated to serve as balancers.

Of the motors incorporated into the foregoing embodiment, Alnico (aluminum nickel cobalt) permanent magnetic torque motors of relatively large size are used for driving the arms about the first to third axes $P_1$ to $P_3$, and samarium cobalt permanent magnetic torque motors of high performance and relatively small size for driving the arms about the fourth to seventh axes $P_4$ to $P_7$. In either case, the motors to be used for this invention are high-torque motors which rotate at a low speed.

We claim:

1. Means for joining a first segment of a manipulator arm with a second segment connected at one end with manipulating means in a composite joint allowing rotation of the second segment about an axis at an angle to the longitudinal axis of the first segment and providing pivotal movement of the second segment about the common longitudinal axis of the segments comprising a fork fixed to an end of the first segment, a pin rotatably mounted in said fork, means pivotally mounting the second segment in the pin normal thereto so that both ends of the second segment extend therefrom, a rotor or stator coaxially affixed to the end of the second segment opposite the manipulator means end and a stator or rotor coaxial with its mating rotor or stator at the end of the second segment affixed to said pin, whereby the weight of said rotor and stator tend to counter-balance the weight of the manipulator means of the second segment.

2. Means for joining a first segment of a manipulator arm with a second segment connected at one end with manipulating means in a composite joint providing rotation of the second segment about an axis at an angle to the longitudinal axis of the first segment and allowing pivotal movement of the second segment about the common longitudinal axis of the segments comprising a fork fixed to an end of the first segment, a pin rotatably mounted in said fork, means pivotally mounting the second segment on the pin normal thereto, a stator or rotor mounted in each element of said fork, and a rotor or stator mounted on each end of the pin coaxially with its mating stator or rotor in said fork, whereby the motor load on the pin is balanced.

3. Apparatus of claim 2 including a rotor or stator affixed to the second segment coaxially therewith and a stator or rotor mounted on the pin coaxially with its mating rotor or stator affixed to the second segment.

4. Apparatus of claim 1 or 2 in which at least one rotor or stator is a permanent magnet containing cobalt and one or more rare earth metals.

* * * * *